United States Patent [19]

McIntyre et al.

[11] Patent Number: 5,561,964

[45] Date of Patent: Oct. 8, 1996

[54] APPARATUS AND METHOD FOR HEAT SEALING POUCHES

[75] Inventors: Dennis A. McIntyre, Rochester; James B. Roy, Ontario, both of N.Y.

[73] Assignee: Eastman Kodak Company, Rochester, N.Y.

[21] Appl. No.: 414,479

[22] Filed: Mar. 31, 1995

[51] Int. Cl.⁶ .................................................. B65B 57/00
[52] U.S. Cl. .............................. 53/75; 53/373.3; 219/667
[58] Field of Search ..................... 53/373.7, 75, 373.3; 219/477, 650, 659, 663, 667, 729

[56] References Cited

U.S. PATENT DOCUMENTS

| | | | |
|---|---|---|---|
| 2,651,444 | 9/1953 | Casey et al. | 226/56 |
| 2,863,267 | 12/1958 | Moore | 53/22 |
| 2,888,792 | 6/1959 | James | 53/112 |
| 2,963,838 | 12/1960 | Harrison et al. | 53/79 |
| 3,348,474 | 10/1967 | Virta et al. | 53/75 |
| 3,589,098 | 6/1971 | Schainholz et al. | 53/79 |
| 4,221,101 | 9/1980 | Woods | 53/79 |
| 4,369,611 | 1/1983 | Canfield | 53/127 |
| 5,117,613 | 6/1992 | Pfaffmann | 219/667 |
| 5,265,397 | 11/1993 | Depoint et al. | 53/434 |
| 5,280,422 | 1/1994 | Moe et al. | 364/140 |
| 5,321,230 | 6/1994 | Shanklin et al. | 53/373.7 |
| 5,347,791 | 9/1994 | Ginzl et al. | 53/75 |

OTHER PUBLICATIONS

Nichrome, published by Engineering Alloys Digest, Inc. Dated Apr. 1958. Filing Code: Ni–41.

*Primary Examiner*—John Sipos
*Assistant Examiner*—Gene L. Kim
*Attorney, Agent, or Firm*—Susan L. Parulski

[57] ABSTRACT

The invention relates to an apparatus and method for heat sealing object(s) in various size pouches (10). A closed-loop temperature control system is provided for impulse sealing an open mouth of the pouch. The method includes calculating a heating-on time based on the difference between the actual temperature of the sealing jaw(s) and the desired temperature at which to heat seal the pouch.

6 Claims, 10 Drawing Sheets

APPARATUS AND METHOD FOR HEAT SEALING POUCHES

CROSS REFERENCE TO RELATED APPLICATIONS

This application is related to the application titled, "APPARATUS AND METHOD FOR VACUUM SEALING POUCHES", by Koelsch, Mcintyre and Roy, filed this same date, by same assignee.

FIELD OF THE INVENTION

The invention relates to an apparatus for packaging objects. More particularly, the invention relates to an apparatus and method for vacuum sealing objects in various size pouches.

BACKGROUND OF THE INVENTION

A variety of apparatus and methods are known for wrapping or pouching objects in containers, particularly objects made from flexible materials. Such known apparatus and methods are limited in their abilities to adjust readily for changes in the size of the objects, the size or format of the container, or both. Many such known apparatus and methods are also limited in their abilities to wrap or pouch objects which require more gentle handling due to their ease of damage or their unstable structure. For example, stacks of slippery sheets of x-ray film or photographic paper must be handled carefully due to the sensitivity of the film to scratches, pressure marks, and the like. In addition, stacks of sheets of such objects having slippery surface properties are easily shifted out of their desired right-rectangular stack configuration, thereby producing an irregularly shaped, skewed stack which is difficult to handle and package. Often, the objects are vacuum sealed in the pouch so that the objects will not slide from their stack configuration. The amount of vacuum affects the packaging quality, as does the heat seal required to maintain the vacuum within the sealed pouch. The vacuum and seal must be sufficient to secure the objects within the pouch, yet allow a user to tear the pouch open to access the objects.

Figure 1:
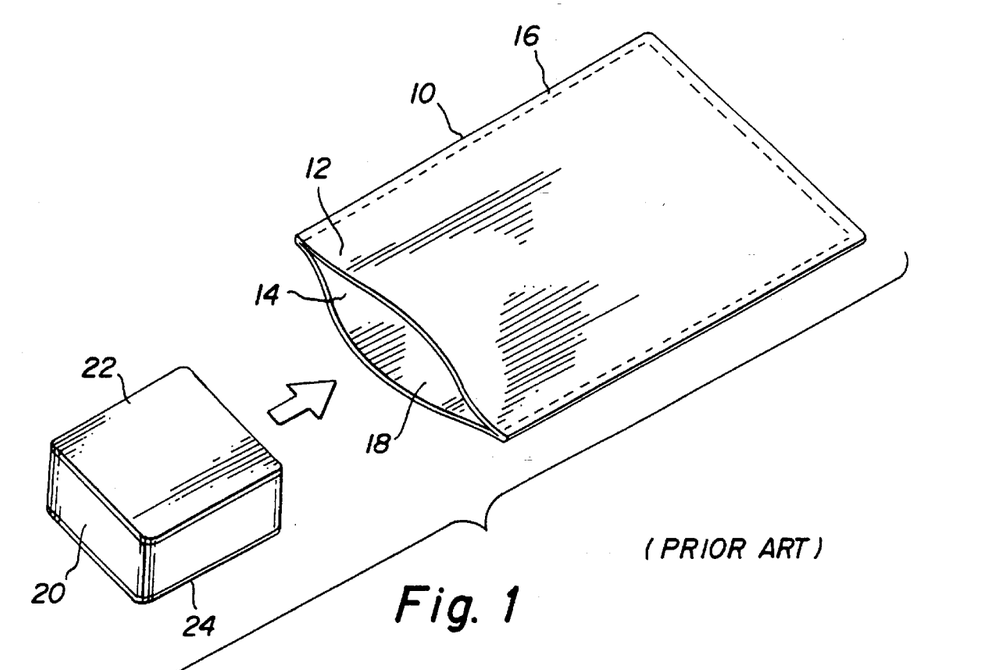
FIG. 1 shows a perspective view of an object and pouch of a type known in the art, but useful in the apparatus of the invention.
Figure 2:
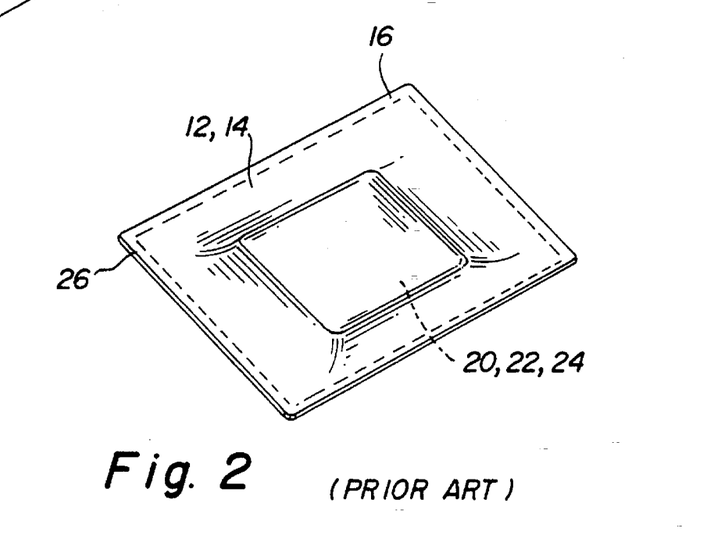
FIG. 2 shows a perspective view of a completed package of a type closed and sealed by the apparatus of the invention.

FIG. 1 shows a pouch and an object of some typical types. Pouch 10 can be formed from a pair of preferably congruent opposed side walls 12,14 joined together by a peripheral seal 16, such as a continuous heat seal, but unjoined on one side, thereby forming an opening or mouth 18. The joined sides may include flaps, rip strips, or other features desired for a particular application. A typical object to be packaged would be a single object or an essentially right rectangular stack 20 of sheet material. The top and bottom sheet of stack 20 may be covered by dunnage cards 22,24 to protect the object during handling. Once the object has been positioned within pouch 10, pouch 10 can be evacuated of air which causes side walls 12,14 to conform generally to the shape of the object. Mouth 18 can be closed by a seal 26, to produce a packaged object of the general configuration shown in FIG. 2.

Figure 3:
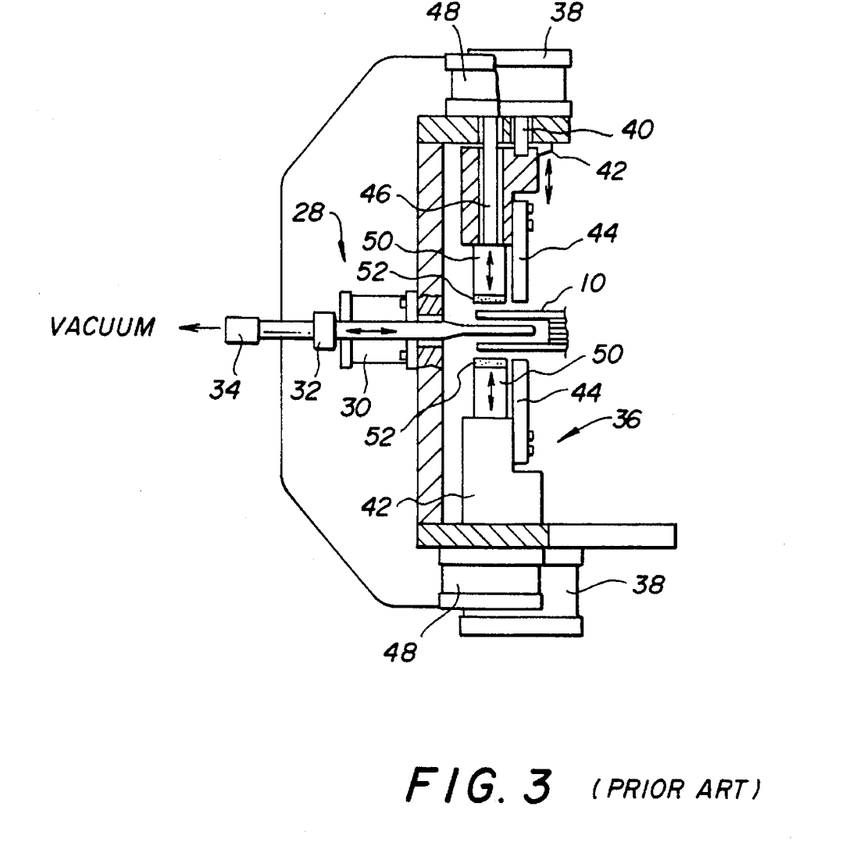
FIG. 3 shows a section view of a prior art apparatus for closing and sealing a pouch of the type illustrated in FIG. 1 and FIG. 2.

U.S. Pat. No. 5,265,397 (DePoint et al), commonly assigned, herein incorporated by reference, relates to a flexible apparatus and process for loading and sealing pouches. FIG. 3 discloses pouch 10 positioned for evacuating and sealing. A pouch evacuation apparatus 28 is provided which comprises a pneumatic actuator 30. The actuator rod of actuator 30 extends toward the rear of the apparatus and fixedly supports a transverse support block 32 for a pair of evacuator probes or tubes 34, only one of which appears in FIG. 3. Probes 34 are positioned essentially on the centerline of the open mouth of pouch 10, and are connected to a suitable vacuum source. Above and below probes 34 are mounted upper and lower pouch closing and sealing jaws 36 which comprise upper and lower pairs of pneumatic actuators 38 having actuator rods 40 which support transversely extending mounting bars 42. Attached to bars 42 are pairs of aligned, oppositely facing and transversely extending heat sealing bars or jaws 44. Actuator rods 46 of upper and lower pairs of pneumatic actuators 48 support aligned, oppositely facing and transversely extending pouch closing bars or clamping jaws 50, each having a layer 52 of foam rubber or similar resilient material on its surface facing probes 34. Actuator 30 extends probes 34 through the mouth of pouch 10 into fairly close proximity to the enclosed object. Actuators 48 are then actuated to extend clamping jaws 50 into contact with the side walls of pouch 10, thus compressing layers 52 to provide a mechanical seal between the side walls and around the extended probes 34. Vacuum is then applied to probes 34 for a time sufficient to evacuate the pouch, after which probes 34 are withdrawn behind sealing edges 44, but with the vacuum still being drawn. Actuators 38 are then actuated to press sealing jaws 44 into contact with pouch 10 to form seal 26 and complete the package. Vacuum is then stopped and actuators 38, 48 are deactuated to release the package.

While the apparatus disclosed in DePoint has achieved a level of success, the vacuum levels in the completed pouches may vary. Accordingly, there continues to be a need for an apparatus which provides precise control of the vacuum during the vacuum sealing process, provides consistent vacuum levels in the completed pouches, achieves high levels of vacuum during the vacuum sealing process. There also continues to be a need for such an apparatus which does not clog during the vacuum sealing process. Further, a need continues for a method for selectively heat sealing the pouches to provide a heat seal.

SUMMARY OF THE INVENTION

An object of the invention is to provide a packaging apparatus whose vacuum levels can be precisely controlled, provides consistent vacuum levels in the packaged object, and achieves high levels of vacuum during the vacuum sealing process.

A further object of the invention is to provide a apparatus which forms a mechanical seal during the evacuation process.

Another object of the invention is to provide an apparatus which does not clog during the vacuum sealing process.

Yet another object of the invention is to provide a method for selectively controlling the heat sealing process.

These objects are given only by way of illustrative examples; thus, other desirable objectives and advantages inherently achieved by the disclosed invention may occur or become apparent to those skilled in the art. The invention is defined by the appended claims.

According to one aspect of the invention, an apparatus is provided for packaging an object in a pouch, the pouch having an opposed pair of side walls joined to form an open mouth. A frame with a support surface supports the pouch and a snorkel assembly. The snorkel assembly includes a snorkel guide member telescopically surrounding a probe. The probe moves axially relative to the snorkel guide member and has an end adapted to be inserted into the pouch through the open mouth. Means are provided to move probe between an extended within the pouch and a withdrawn position. The probe includes an axial channel through which air can flow. When vacuum is applied to the axial channel, air can be removed from the pouch. A clamp assembly is transversely mounted relative to the snorkel assembly, and includes a pair of clamping jaws which move relative to each other between an open and closed position. The clamping jaws engage and clamp the pouch around the snorkel guide member when the clamping jaws close. A seal assembly is transversely mounted relative to the snorkel assembly and is positioned between the object in the pouch and the clamp assembly. The seal assembly has a pair of sealing jaws which move between an open and closed position. In the closed position, the sealing jaws engage the pouch therebetween to form a seal in the open mouth.

According to another aspect of the invention, the apparatus comprises a frame with a support surface supporting the pouch and a snorkel assembly. The snorkel assembly includes a snorkel guide member telescopically surrounding a probe. The probe moves axially relative to the snorkel guide member and has an end adapted to be inserted into the pouch through the open mouth. Means are provided to move probe between an extended within the pouch and a withdrawn position. The probe includes an axial channel through which air can flow. When vacuum is applied to the axial channel, air can be removed from the pouch. A clamp assembly is transversely mounted relative to the snorkel assembly, and includes a pair of clamping jaws which move relative to each other between an open and closed position. The clamping jaws each include a clamping notch, where the clamping notches define an aperture geometrically similar to an external configuration of the snorkel guide member. The clamping notches engage and clamp the pouch around the snorkel guide member when the clamping jaws are in their closed position. A seal assembly is transversely mounted relative to the snorkel assembly and is positioned between the object in the pouch and the clamp assembly. The seal assembly has a pair of sealing jaws which move between an open and closed position. In the closed position, the sealing jaws engage the pouch therebetween to form a seal in the open mouth.

According to yet a further aspect of the invention, a method is provided for packaging an object in a pouch. The method comprising the steps of: providing a snorkel assembly having a snorkel guide member telescopically surrounding a probe, the probe including an end and an axial channel through which air can flow, the probe being axially movable relative to the snorkel guide member; extending the end of the probe from the snorkel guide member; inserting the end of the probe into the pouch through the open mouth; clamping the pouch around the snorkel guide member; applying a vacuum to the axial channel to remove air from the pouch; withdrawing the end of the probe into the snorkel guide member; engaging the open mouth of the pouch between a first and second sealing jaw; disengaging the vacuum to the axial channel; applying heat to the first and second sealing jaws to heat seal the open mouth of the pouch; disengaging the first and second sealing jaws; and unclamping the pouch from around the snorkel guide member.

According to yet a further aspect of the invention, there is provided a method for selectively applying heat to a sealing jaw to heat seal an open mouth of a pouch. The method includes the steps of: selecting a total heat cycle time during which heat can be applied by the sealing jaw to the pouch; selecting a cycle time increment which is less than the total heat cycle time; selecting a minimum time increment during which heat can be applied to the sealing jaw, the minimum time increment being less than the cycle time increment; selecting a maximum time increment during which heat can be applied to the sealing jaw, the maximum time increment being greater than or equal to the minimum time increment, and being less than the cycle time increment; selecting a desired temperature at which to heat the sealing jaw to form the heat seal; and selecting a baseline temperature by which to regulate the application of heat to the sealing jaw, the baseline temperature being less than the desired temperature. A heating-on time is calculated by sensing an actual temperature of the sealing jaw, determining a difference between the desired temperature and the actual temperature, setting the heating-on time to the maximum time increment if the difference is greater than or equal to the baseline temperature, setting the heating-on time to a value less than the maximum time increment and greater than zero if the difference is less than the baseline temperature, and greater than zero, and setting the heating-on time to zero if the difference is less than or equal to zero. The sealing jaw is heated for the heating-on time, and then the sealing jaw is cooled by turning off the heat for the remainder of the cycle time increment. The steps of calculating, heating, and cooling are repeated for each cycle time increment until the total heat cycle time is reached.

According to still another aspect of the invention, there is provided an apparatus for selectively applying heat to a sealing jaw to heat seal an open mouth of a pouch. The apparatus includes means for selecting a cycle time increment during which heat can be applied to the sealing jaw; means for selecting a minimum time increment during which heat can be applied to the sealing jaw, the minimum time increment being less than the cycle time increment; means for selecting a maximum time increment during which heat can be applied to the sealing jaw, the maximum time increment being greater than or equal to the minimum time increment, and being less than the cycle time increment; means for selecting a desired temperature at which to heat the sealing jaw to form the heat seal; and means for selecting a baseline temperature by which to regulate the application of heat to the sealing jaw, the baseline temperature being less than the desired temperature. The apparatus further includes means for sensing an actual temperature of the sealing jaw; means for calculating a heating-on time for each cycle time increment based on a difference between the desired temperature and the actual temperature; means for applying heat to the sealing jaw for the heating-on time; and means for turning off heat to the sealing jaw for the remainder of the cycle time increment.

An advantage of the apparatus of the invention is that it is flexible enough to handle changes in object size, the size or format of the container, or both; allows control of the vacuum during the sealing process; provides consistent vacuum levels in the packaged objects; provides a mechanical seal during evacuation of the pouch; generates a heat seal; achieves a high level of vacuum; provides a non-clogging evacuation system; allows for system set-up by product; and allows for benchmarking (e.g., quality checks) of the system.

BRIEF DESCRIPTION OF THE DRAWING

The foregoing and other objects, features, and advantages of the invention will be apparent from the following more particular description of the preferred embodiments of the invention, as illustrated in the accompanying drawings.

DETAILED DESCRIPTION OF THE INVENTION

The following is a detailed description of the preferred embodiments of the invention, reference being made to the drawings in which the same reference numerals identify the same elements of structure in each of the several figures.

Referring again to FIG. 1, pouches for use in the invention may be made from any suitable material but preferably the material is gas impervious and can be heat sealed. Such pouches can be stacked flat and are readily picked up and moved by conventional means such as suction cup arrays. Stack 20 may be, for example, x-ray film sheets or photographic paper. Mouth 18 may be held open by conventional means, such as a suction cup array, and the object can be positioned inside pouch 10 through mouth 18.

Figure 4:
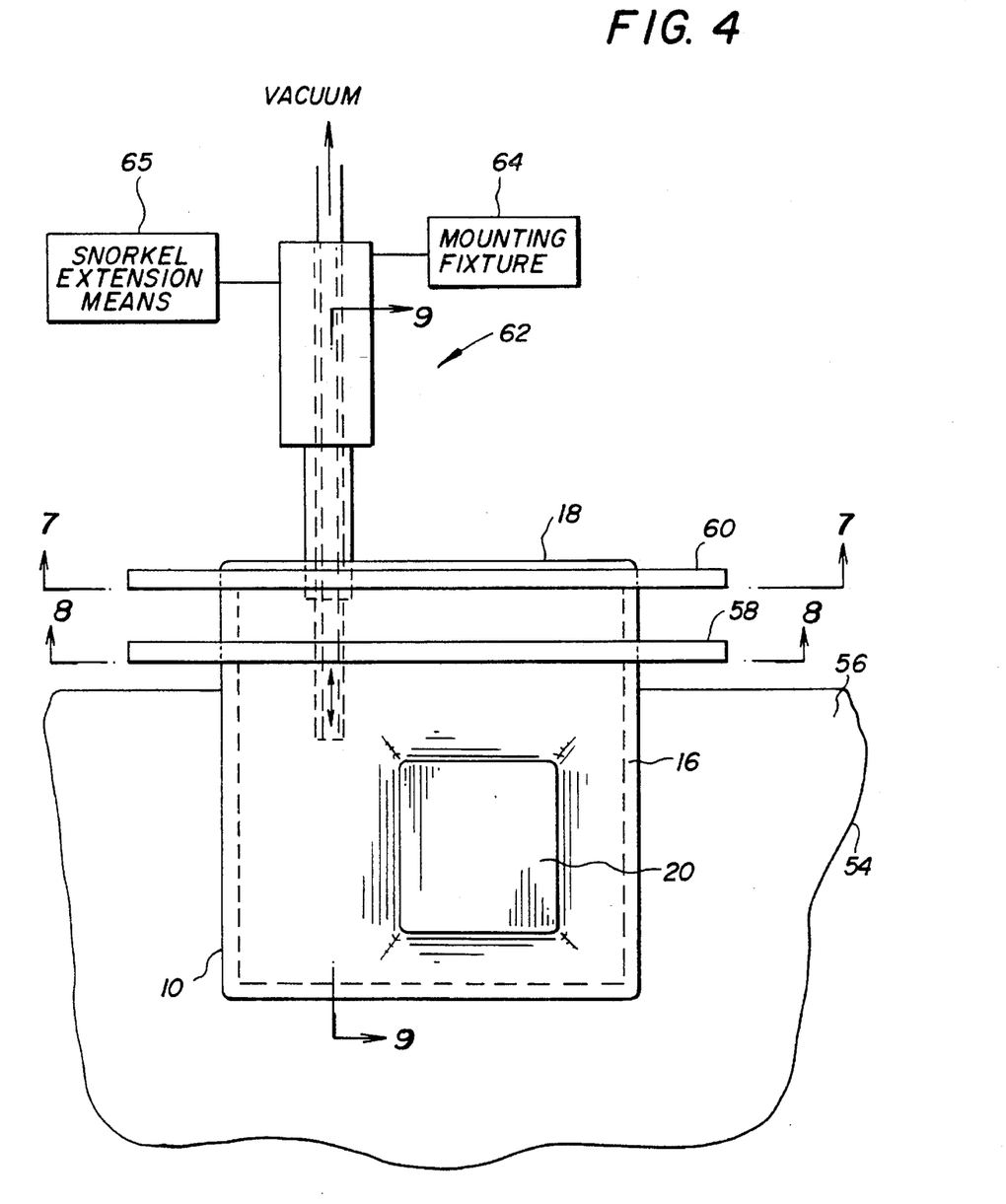
FIG. 4 shows a top view of the apparatus of the invention.

FIG. 4 shows the apparatus of the invention which comprises a frame 54 having a support surface 56, a seal assembly 58 including upper and lower sealing jaws 44, a clamp assembly 60 including upper and lower clamping jaws 50, pouch evacuation assembly 28 including a snorkel assembly 62, a mounting fixture 64 for mounting snorkel assembly 62 to frame 54, snorkel extension means 65, and a vacuum source in association with snorkel assembly 62. As will be discussed in detail below, while clamp assembly 60 secures pouch 10, snorkel assembly 62 evacuates the air from pouch 10. Once the air is evacuated, seal assembly 58 seals pouch 10, and clamp assembly 60 then releases pouch 10.

Support surface 56 supports pouch 10. A source or hopper (not shown) of pouches may be attached or associated with support surface 56. Pouches 10 can be removed from the source and oriented on support surface 56 by any suitable means, such as manually or with a programmable robot. Support surface 56 may include a guide fixture (not shown) to orient pouch 10 for sealing. Support surface 56 may further include removal means (not shown) for removing filled, evacuated, and sealed packages.

Figures 5, 6:
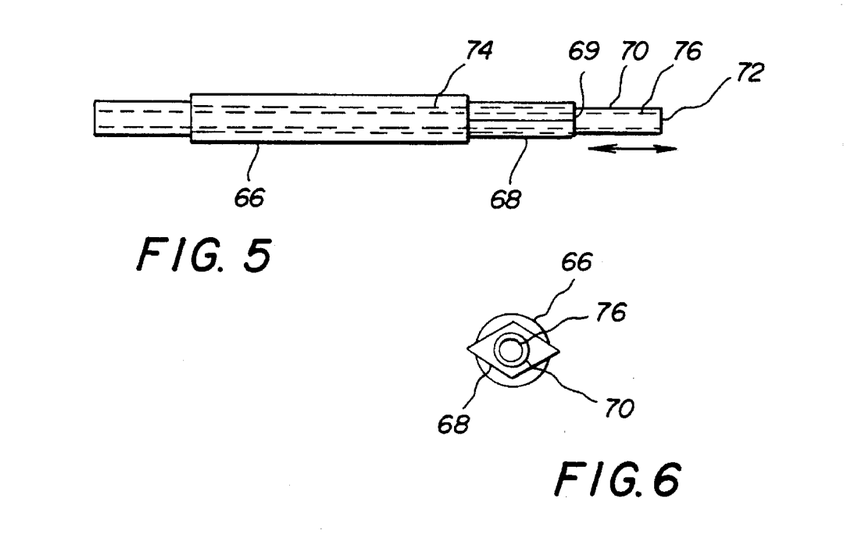
FIG. 5 shows a side view of the snorkel assembly of the invention.
FIG. 6 shows an enlarged end view of the snorkel assembly, as seen from the right in FIG. 5.

As illustrated in FIG. 5 and FIG. 6, snorkel assembly 62 includes a snorkel support member 66, an elongated snorkel guide member 68 having an end 69, and an elongated, generally tubular probe 70 having an end 72. Snorkel guide member 68 telescopically surrounds probe 70. That is, a first channel 74 extends axially through snorkel guide member 68 and snorkel support member 66. Probe 70 is configured to be closely fit (i.e., minimal clearance) within first channel 74, thereby minimizing leakage between probe 70 and first channel 74. Probe 70 is movable axially within channel 74 so that probe end 72 can be extended outward of snorkel guide member end 69 by snorkel extension means 65, for example, pneumatic actuator 30. In such a configuration, probe 70 is a telescoping inner-snorkel which can be extended or retracted (i.e., withdrawn) from snorkel guide member 68. A second channel 76 extends axially through probe 70 through which air can flow, allowing for the evacuation of pouch 10. In an alternate embodiment, snorkel support member 66 telescopically surrounds snorkel guide member 68. That is, snorkel guide member would be movable axially within snorkel support member 66, for example, by pneumatic actuator 30, and probe 70 would be movable axially within snorkel guide member 68.

Referring now to FIGS. 7–10, seal assembly 58 is positioned transversely to support surface 56, so as to be positioned between stack 20 and clamping assembly 60. Sealing jaws 44, each having a sealing edge 82, move relative to each other between an open position and a closed position. In the open position, sealing edges 82 are spaced apart from each other to allow pouch 10 and probe 70 to be positioned therebetween. In the closed position, sealing edges 82 are pressed into contact with pouch 10 to provide a mechanical seal between sealing edges 82 and pouch 10, such that heat can be applied to heat seal the unjoined end of pouch 10. Conventional actuation means, such as pneumatic actuators 38, can be used to move sealing jaws 44 between their open and closed positions. Those skilled in the art will recognize that the closed position can be accomplished by moving one sealing jaw while holding the other sealing jaw stationary or by moving both sealing jaws 44. Sealing jaws 44 can be of any size, however, the length of sealing edges 82 must be at least the length of the unjoined side of pouch 10 in order to seal the length.

Various configurations of sealing jaws are known to those skilled in the art. For example, sealing jaws 44 can comprise a heat conducting element (e.g., NICHROME, trademark of the Driver-Harris Company, including nickel and chromium), an insulating material, a support material (e.g., aluminum), a heat sensor (e.g., thermocouple(s) 86), and a compliant member (e.g., rubber) providing compliance to form a seal. A sealing pressure in the range of 50–100 psi (pounds per square inch), preferably 80 psi, is suitable to form a mechanical seal between sealing jaws 44 and pouch 10.

Figure 7A:
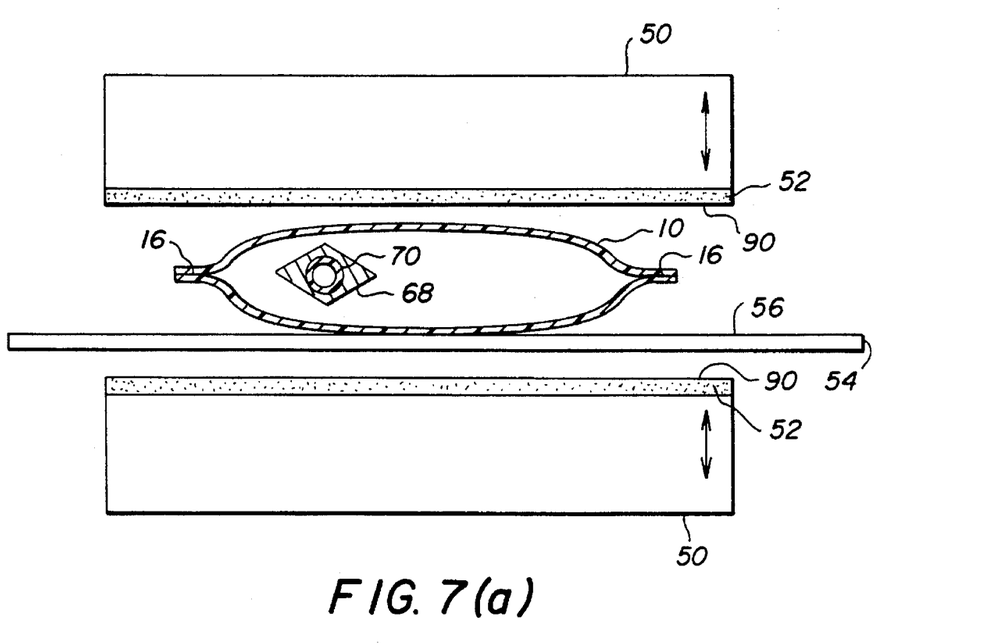
FIG. 7(a) shows a first embodiment of a section view through the apparatus of the invention, taken along line 7—7 of FIG. 4.
Figure 7B:
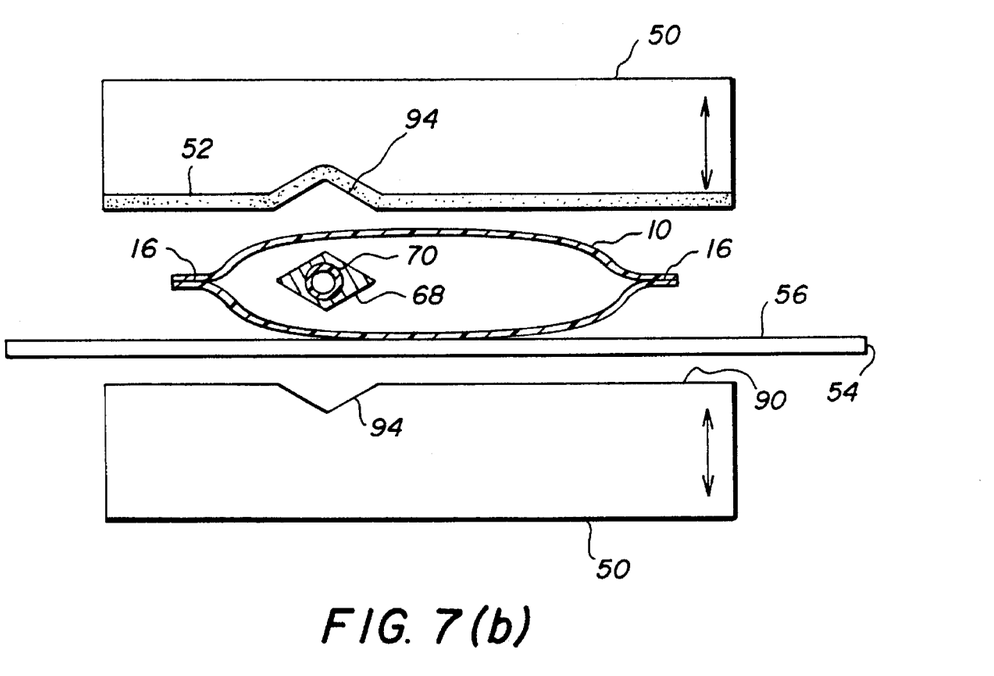
FIG. 7(b) shows a second embodiment of a section view through the apparatus of the invention, taken along line 7—7 of FIG. 4.
Figure 8:
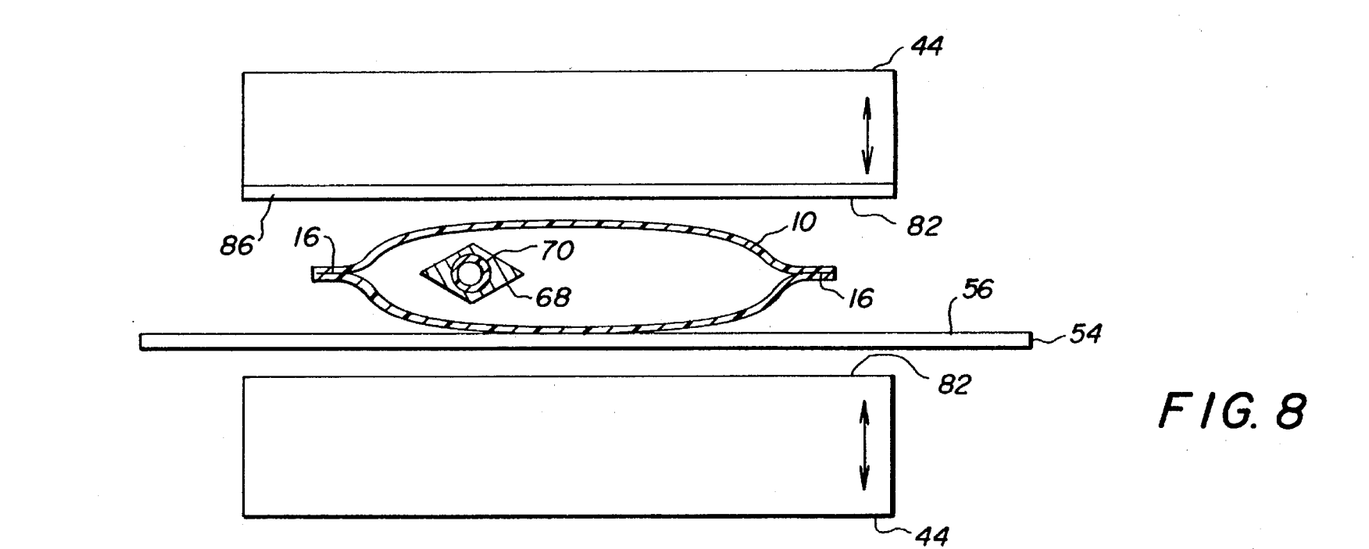
FIG. 8 shows a section view through the apparatus of the invention, taken along line 8—8 of FIG. 4.
Figure 9:
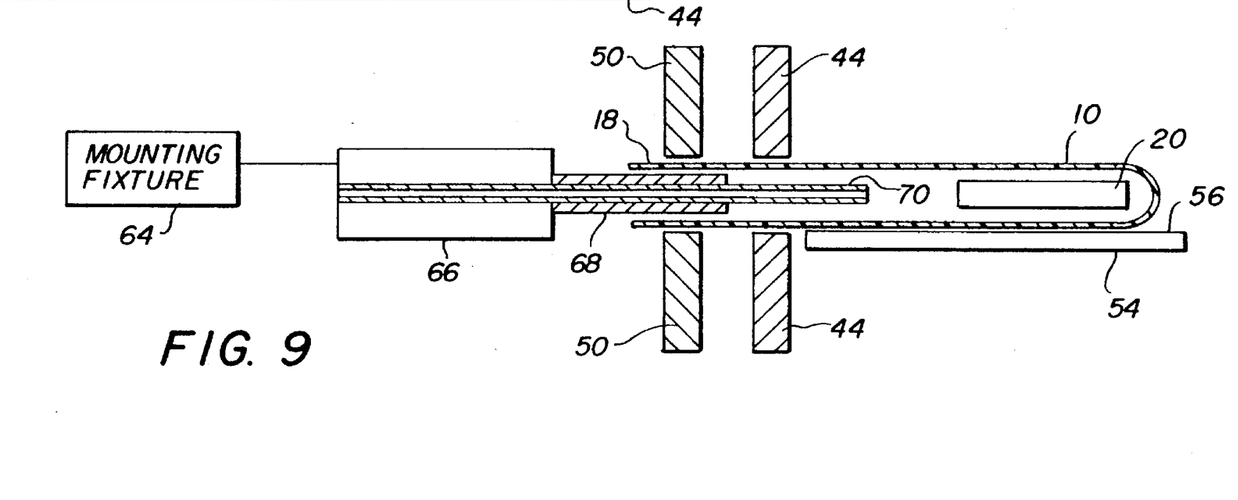
FIG. 9 shows a section view through the apparatus of the invention, taken along line 9—9 of FIG. 4.

Clamp assembly 60 is positioned transversely to support surface 56 such that seal assembly 58 is positioned between stack 20 and clamp assembly 60. As shown in FIGS. 7(a) and 7(b), clamp assembly 60 comprises two clamping jaws 50, each with a clamping edge 90. Clamping jaws 50 move relative to each other between an open position and a closed position. In the open position, clamping edges 90 are spaced apart from each other such that snorkel guide member 68 and pouch 10 can be positioned therebetween. In the closed position, clamping edges 90 are pressed together to engage and clamp pouch 10 around snorkel guide member 68, to provide a mechanical seal between clamping edges 90, snorkel guide member 68, and pouch 10. Conventional actuation means, such as pneumatic actuators 38, can be used to move clamping jaws 50 between their open and closed positions. Those skilled in the art will recognize that the closed position can be accomplished by moving one clamping jaw while holding the other clamping jaw stationary or by moving both clamping jaws 50. Clamping jaws 50 can be of any size, however, the length of clamping edges 90 must be at least the length of the unjoined side of pouch 10 in order to clamp its length.

Figures 10, 11:
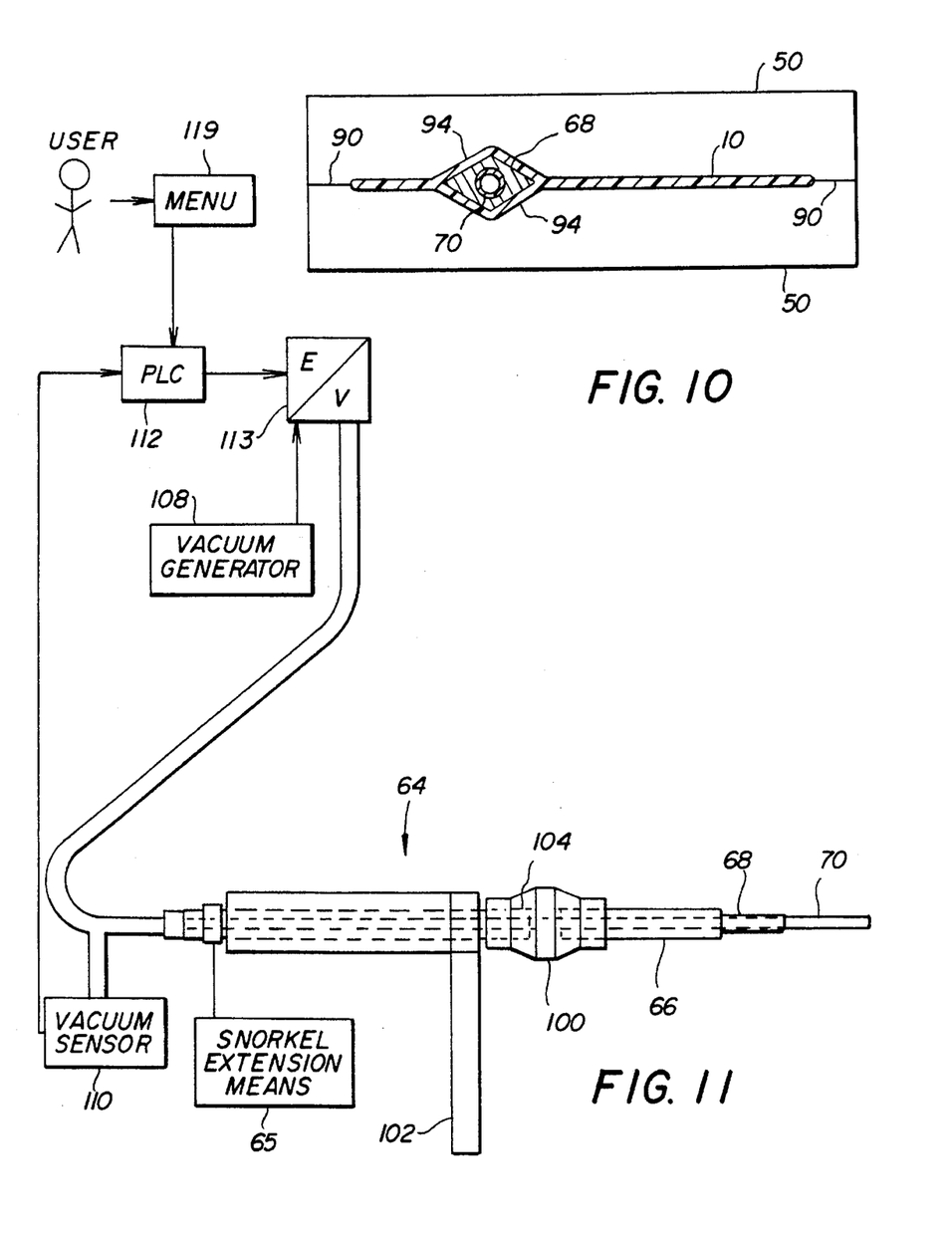
FIG. 10 shows the embodiment of the clamping jaws of FIG. 7(b) in their closed position.
FIG. 11 shows a side elevation of the snorkel assembly, and the mounting fixture.

Clamping jaws 50 engage and clamp snorkel guide member 68 around pouch 10 to form a mechanical seal between clamping edges 50, clamping edges 90 and pouch 10, between pouch 10 and snorkel guide member 68, and between sides 12,14 of pouch 10. Clamping jaws 50 can have various configurations to form such a mechanical seal, thereby promoting precision evacuation. In a first embodiment illustrated in FIG. 7(a), clamping edges 90 each include a linear edge. In a second embodiment, illustrated in FIG. 7(b), clamping edges 90 each include a clamping notch 94 defining an aperture 98 which can, for example, be configured geometrically similar to the external configuration of snorkel guide member 68. Snorkel guide member 68 would then be positioned within aperture 98 (and accordingly, clamping notches 94) when clamping jaws 50 are in their closed position. FIG. 10 illustrates clamping jaws 50 in their closed position, whereby clamping notches 94 engage snorkel guide member 68 and pouch 10. A high clamping force ensures a mechanical hermetic seal, thereby promoting precise control during the vacuum process.

Snorkel guide member 68 (and accordingly, aperture 98 and clamping notches 94), can be of various external configurations (i.e., shapes), for example, semicircular, oval, oblong, or diamond-shaped. FIG. 6 illustrates one embodiment of the diamond-shaped configuration of snorkel guide member 68 wherein the diamond-shaped cross-section is defined by internal angles of 60 degrees and 120 degrees. Likewise, probe 70, and channels 74,76 can have various configurations, though a circular cross-section is illustrated. Snorkel guide member 68 and probe 70 can be made of conventional materials, such as DELRIN, aluminum, or stainless steel.

Clamping jaws 50 can be made of any conventional material, such as aluminum or steel. Clamping edges 90 can likewise be made of the same material as clamping jaws 50, or each clamping edge can have layer 52 of foam rubber or similar resilient material. Alternatively, only one edge of clamping edges 90 can include layer 52, for example, of 30–70 durometer polyurethane (preferably 40 durometer), as illustrated in FIG. 7(b), while the other edge is of a harder material. A suitable clamping force is in the range of 100–200 psi.

Referring now to FIGS. 4–11, snorkel assembly 62 is attached to mounting fixture 64. Mounting fixture 64 comprises a flexible coupling 100, such as a rubber coupling, mounting bracket 102 for attachment to frame 54, and a probe holder 104. While mounting fixture 64 need not include flexible coupling 100, some flexibility in the mounting is preferable to provide compliance in the system, for example, when engaging and clamping pouch 10 around snorkel guide member 68 between clamping notches 94; flexible coupling 100 provides such flexibility. Other mounting means for mounting snorkel assembly 62 will be known to those skilled in the art.

Attached to snorkel assembly 62 is a tube 106, or other means though which air may flow. A vacuum source or generator 108 in association with tube 106 provides vacuum to evacuate air from pouch 10. A vacuum sensor 110 senses the level of vacuum in tube 106, and accordingly, pouch 10. A Programmable Logic Controller (PLC) 112 directs the level of vacuum sensed by vacuum sensor 110 to vacuum generator 108 by means of a transducer or converter 113, which converts the voltage signal to a vacuum level.

Figure 12:
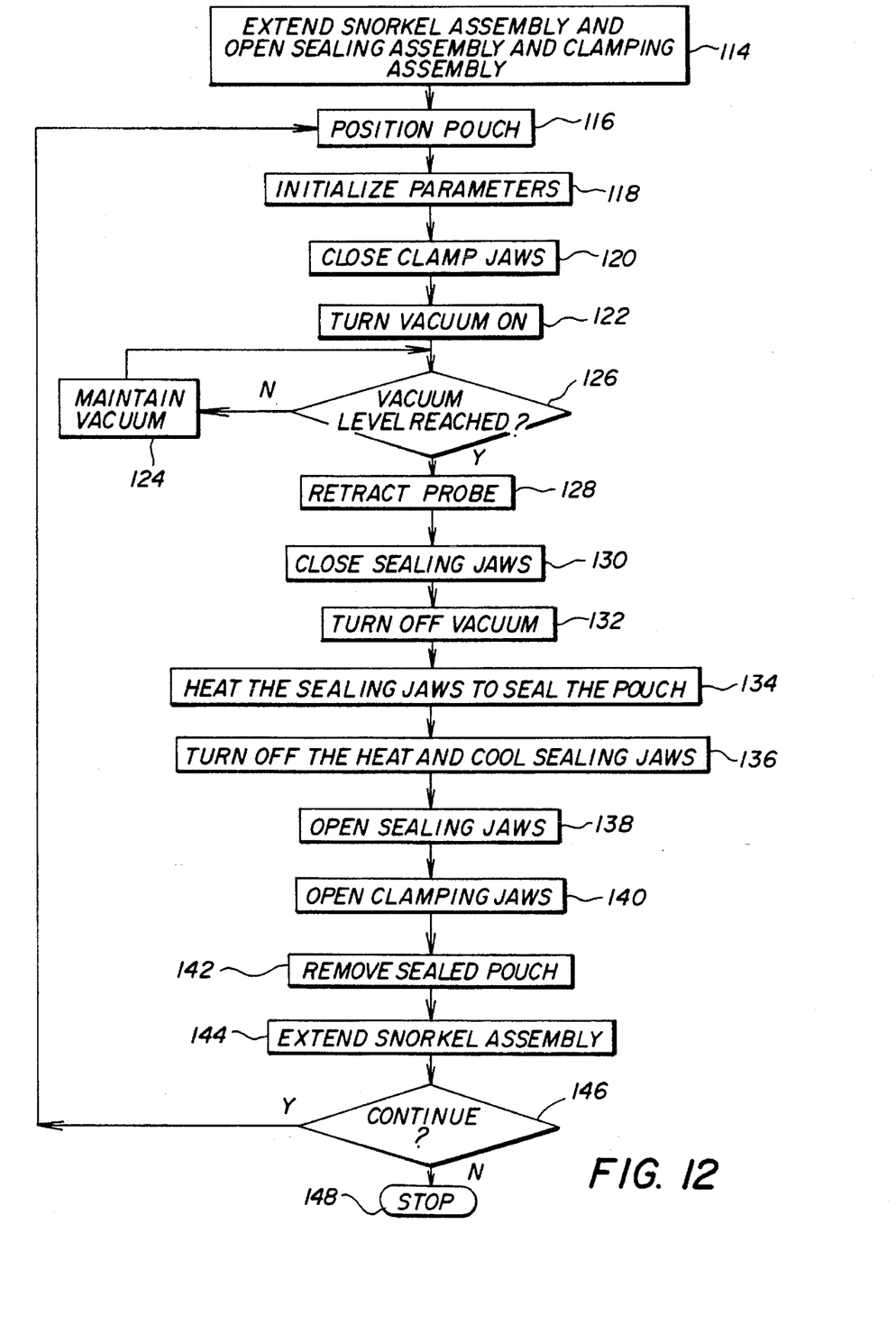
FIG. 12 shows a flowchart of steps of a method of the invention.

A method by which the apparatus operates is indicated by the flowchart shown in FIG. 12. To perform a packaging operation, clamping jaws 50 and sealing jaws 44 are oriented to their open position (114). Snorkel assembly 62 is preferably positioned parallel to support surface 56 and essentially on the centerline of the open mouth of pouch 10. Probe 70 can be either extended or retracted from snorkel guide member 68. Likewise, if snorkel guide member 68 is movable relative to snorkel support member 66, snorkel guide member 68 can be extended or retracted from snorkel support member 66. For this discussion, snorkel guide member 68 does not move relative to snorkel support member 66, and probe 70 is in its extended position (114). Pouch 10 is positioned on support surface 56 with mouth 18 facing snorkel assembly 62, and overhanging frame 54 (116). Snorkel guide member 68 and probe 70 are inserted into mouth 18 of pouch 10. While the placement of pouch 10 is dependent on the application, pouch 10 is placed such that it will be engaged by both seal assembly 58 and clamp assembly 60. The placement of snorkel assembly 62 relative to pouch 10 is dependent on the application. That is, the placement of snorkel assembly 62 depends on the size of pouch 10 and the placement of stack 20 within pouch 10. For example, as shown in FIG. 4, stack 20 is positioned on the right side of pouch 10. Accordingly, snorkel assembly 62 is positioned to the left side of pouch 10. However, snorkel assembly could have been positioned above stack 20. Snorkel assembly 62 is inserted inside pouch 10 such that clamping notches 94 will close over snorkel guide member 68 and pouch 10, and not close over snorkel support member 66 or probe 70. Sealing edges 82 should not intersect snorkel support member 66 or snorkel guide member 68 when in their closed position. Nor should sealing edges 82 intersect probe 70 in its extended or retracted position when in sealing edges 82 are in their closed position. Probe 70 should extend within a few millimeters of stack 20. Preferably, the distance from probe end 72 to stack 20 is approximately equal to one-half the thickness of stack 20 (i.e. the object being packaged). Such a positioning ensures that probe 70 does not clog (i.e., not blocked by stack 20 or pouch 10; the pouch does not collapse around probe 70) during evacuation.

The element parameters (such as, time, temperature, and the vacuum level setting) are initialized (118). These element parameters can be initialized manually, or a central instrument, such as PLC 112, can provide an on-line total process control system. Such an instrument could include a user interacting with a menu 119 (as illustrated in FIG. 11) to select stored, pre-set parameters for particular object/pouch configurations, thereby allowing a user to recall settings with one selection. This allows for instantaneous set-up of established variables and repeatable results independent of human error, and allows a means to diagnose the process and establish product quality benchmarks.

Clamp jaws 50 are oriented to their closed position such that clamping notches 94 engage and clamp pouch 10 around snorkel guide member 68 (120). The vacuum is initiated (122) and maintained (124) until a determination is made that the desired vacuum level is reached (126). Probe 70 is retracted while still maintaining vacuum (128). Sealing jaws 44 are oriented to their closed position, thereby engaging and pressing pouch 10 (130). When sealing jaws 44 are closed, the vacuum can be turned off (132). (Alternatively, vacuum can be maintained until the heat seal is formed.) With sealing jaws 44 closed, heat is applied to sealing jaws 44 to form a heat seal of pouch 10 (134). When the desired seal is obtained, the heat is stopped, and sealing jaws 44 cool (or chill) while still in their closed position (136). Sealing jaws 44 are then oriented to their open position (138), and clamping jaws 50 open to release pouch 10 (140). The sealed pouch can then be removed by conventional means (142). Probe 70 is then preferably extended in preparation of another packaging operation (144). If another packaging operation is to occur (146), the steps are repeated from step 116, although, depending on the application the parameters (step 118) may not need to be reinitialized. If another packaging operation will not occur, the process is stopped (148).

The parameters to be initialized (118), for example, which could be set using menu 119, include:

DESIRED TEMPERATURE (TD)(degrees F) is a desired (i.e., set point) temperature at which to seal pouch 10;

REGULATION TEMPERATURE ($T_R$) (degrees F) is a temperature level used as a baseline temperature for the heating process by which to regulate the amount of heat applied to the sealing jaws;

VACUUM LEVEL (inches Hg) is the desired level of vacuum to be applied to the pouch;

VACUUM DELAY TIME (seconds) is a desired time which should pass before the PLC senses the vacuum level in vacuum sensor 110;

VACUUM BOOST (inches Hg) is an optional setting for large pouches which allows an initial large vacuum draw;

TOTAL HEATING TIME (seconds) is the total time by which sealing jaws 44 can be heated; and COOL (or CHILL) TIME (seconds) is the total time by which the heat will be turned off after sealing jaws 44 have been heated, so as to dissipate the heat from the sealing jaws.

Other parameters typically set for each apparatus (and therefore, need not be set for each individual packaging operation), for example by menu 119, include:

CYCLE TIME INCREMENT (CTI) (seconds) is the time increment by which individual operations occur throughout the packaging operation;

MINIMUM ON TIME (MIN) (seconds) is the minimum time which the sealing jaws will be heated within each cycle time increment;

MAXIMUM ON TIME (MAX) (seconds) is the maximum time which the sealing jaws will be heated within each cycle time increment when the sealing jaw temperature is below the baseline temperature. CTI is equal to MAXIMUM ON TIME plus a constant K (seconds) (i.e., CTI =MAX+K). The constant K can be set to the value of MIN, or can be set at some arbitrary number. Alternatively, MAX and MIN could be set as percentages of CTI.

Referring again to FIG. 11, PLC 112 directs the level of vacuum sensed by vacuum sensor 110 to vacuum generator 108 by means of converter 113. Preferably, the signal from PLC 112 is between 0–10 volts DC, and is converted to 0–30 inches Hg by converter 113. The signal from vacuum sensor 110 is 0–5 volts DC. When the vacuum is turned on (122), PLC 112 delays sensing the vacuum level until VACUUM DELAY TIME has been reached. (This delay time ensures that any spikes or changes in the vacuum level, caused by the start-up of the vacuum, have occurred, so that the vacuum reading is valid.) Once VACUUM DELAY TIME is reached, PLC 112 directs vacuum sensor 110 to sense the vacuum level once for each CYCLE TIME INCREMENT. When VACUUM LEVEL is reached, PLC 112 then signals for the next step to proceed. PLC 112 signals an error situation, if VACUUM LEVEL is not reached. Once sealing jaws 44 are closed, PLC 112 signals the vacuum to stop (132). By such an arrangement, a closed-loop vacuum level control system is provided. Note that for a very low level vacuum control, for example, for removing excess air, a time controlled function could be used.

Although various methods are known to those skilled in the art to control the heat levels in sealing jaws, the arrangement of the invention provides a closed-loop temperature control system for impulse sealing. Temperature control is provided through PLC 112. The actual temperature (TA) of the sealing jaws is sensed by thermocouple 86 (although multiple thermocouples may be provided), and compared to REGULATION TEMPERATURE. PLC 112 determines the difference (DIFF) between the two values (DIFF=$T_D$–$T_A$), and provides logic to set the heating time, thereby providing a pulse width modulated input to a solid state relay for each CYCLE TIME INCREMENT. The relay allows low voltage high current (AC) to the respective heat conducting element. This pulse width modulation is accomplished by breaking each CYCLE TIME INCREMENT into periods of time when the heat is on (HEATING-ON TIME or HON), and periods of time when the heat is off (HEATING-OFF TIME or HOFF), based on DIFF. That is, the smaller the value of DIFF, the lower the value of HON (i.e., the less time that the heat will be applied to the sealing jaws).

Figure 13:
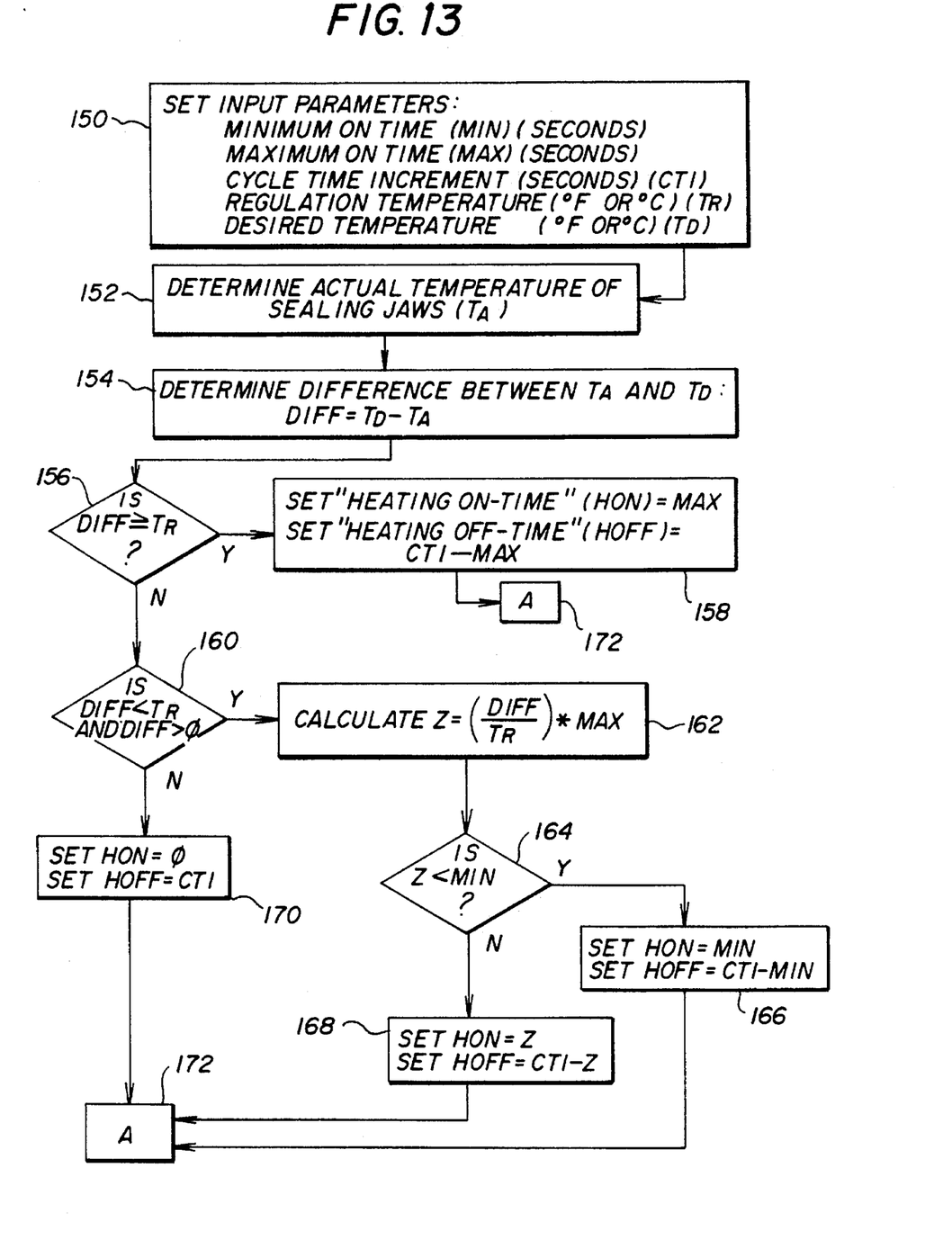
FIG. 13 shows a flowchart of the steps of heating and cooling the sealing jaws identified in FIG. 12.
Figure 14:
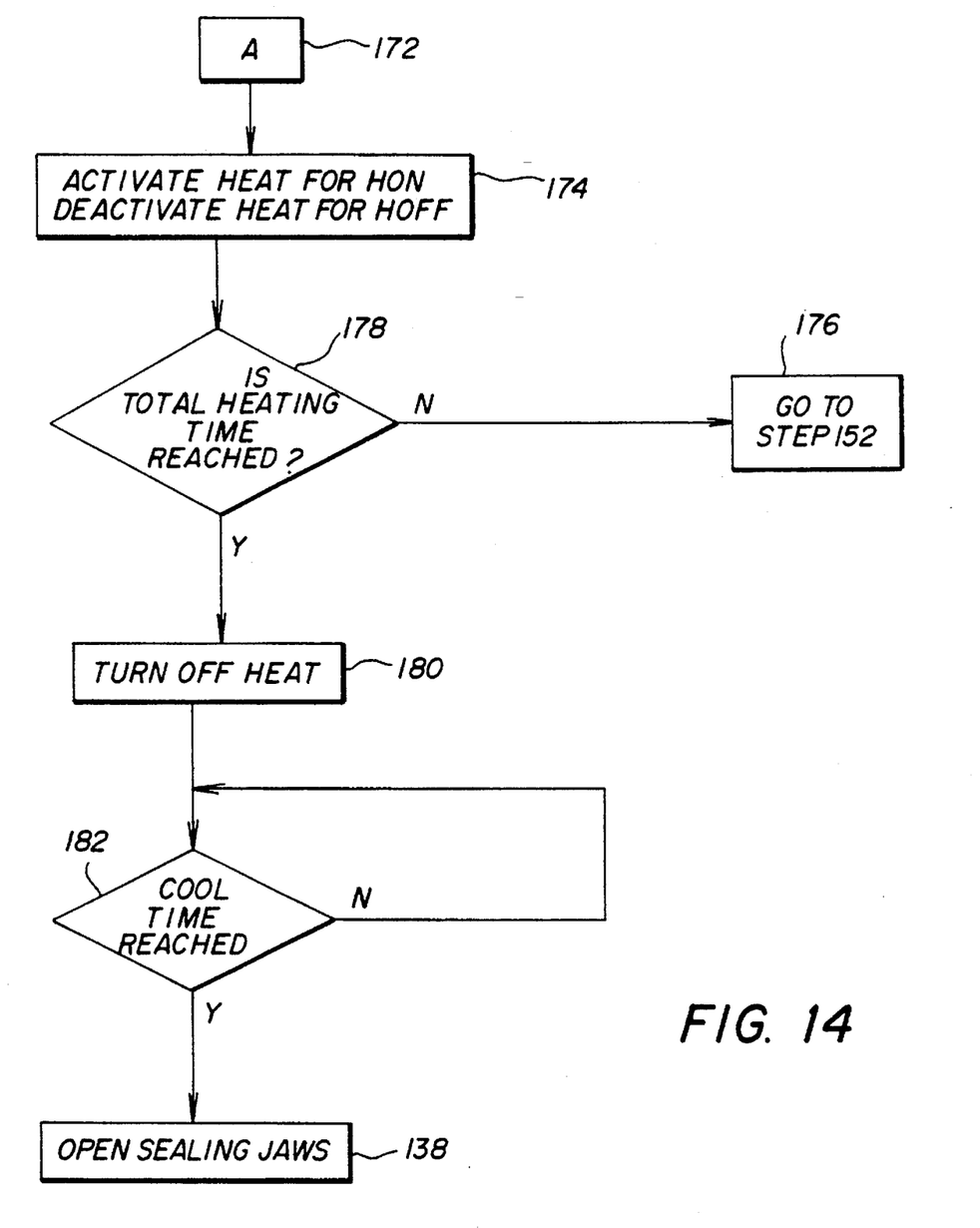
FIG. 14 shows a continuation of the flowchart of FIG. 13.

The process of heating (134) and cooling (136) the sealing jaws is shown in FIGS. 13 and 14. Once the parameters have been selected (150), the actual temperature $T_A$ of sealing jaws 44 is determined (152), for example, using thermocouple 86. The difference DIFF between $T_D$ and $T_A$ is determined (154). The value of DIFF is queried to determine if the value of DIFF is greater than $T_R$ (156). If so, HON is set to MAX, and HOFF is set to CTI-MAX (158). If not, the value of DIFF is queried to determine if the value of DIFF is between $T_R$ and 0 (160). If so, a value Z is calculated (162). If Z is less than MIN (164), then HON is set to MIN, and HOFF is set to CTI-MIN (166). If Z is greater than MIN (168), HON is set to Z, and HOFF is set to CTI-Z (168). If DIFF is not between $T_R$ and O (i.e., DIFF is less than zero), then HON is set to 0.0, and HOFF is set to CTI (170). At which, the sealing jaws are activated with heat (174) for the time HON, and then the heat is turned off for the time HOFF. Steps 152 to 174 are repeated (176) until TOTAL HEATING TIME is reached (178), at which, no heat is applied to the sealing jaws (180). At this time, the COOL timer begins, and the configuration is maintained (that is, the sealing jaws and clamping jaws remain in their closed position) for the time equal to COOL TIME (182). This provides for the seal to be properly formed since some materials (such as monomer-polyethylene) requires cooling under pressure to achieve consistent results. With such materials, heat dissipation should be provided in the regions of the sealing jaws, possibly requiring complex cooling methods (such as water cooling). When COOL TIME has passed, PLC 112 signals the sealing jaws to open (138). PLC 112 will indicate an error situation if the process is not completed as described.

Figure 15:
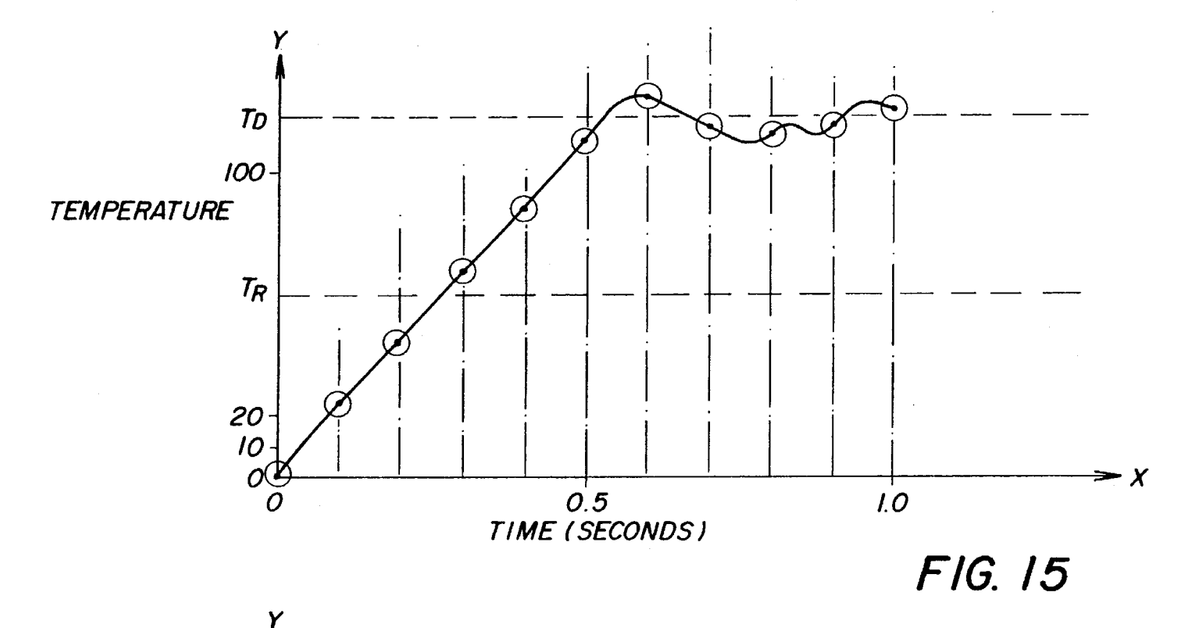
FIG. 15 shows a plot of time versus temperature profile for heating the sealing jaws of the invention.
Figure 16:
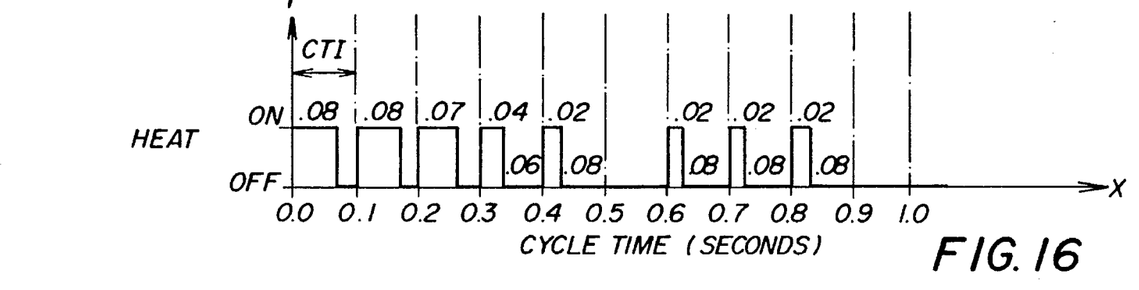
FIG. 16 shows a plot of time versus heating profile for heating the sealing jaws of the invention, corresponding with FIG. 15.

FIGS. 15 and 16 and Table I provide an example of the process outlined in FIGS. 13 and 14, where the time increments are rounded to one-hundredth (i.e., 0.01) of a second. The parameter settings for this example are:

MIN=0.02 second
MAX=0.08 second
K=0.02
CTI=MAX+K=0.1 second
$T_R$=60 degrees F
$T_D$=120 degrees F
TOTAL HEATING TIME=1.0 second FIG. 15 shows a plot of time versus temperature profile for heating the sealing jaws, while FIG. 16 shows a corresponding plot of time versus heating profile for heating the sealing jaws.

For example, at time=0.1, the temperature $T_A$ of FIG. 15 is approximately 25 degrees, and accordingly, DIFF is calculated as:

$$DIFF=120-25=95.$$

Since 95 (i.e., the value of DIFF) is greater than 60 (i.e., the value of TR), HON is set to 0.08 (i.e., MAX), and HOFF is calculated as 0.02 (i.e., CTI−MAX=0.1−0.08=K). As shown in FIG. 16, heat is applied to the sealing jaws for 0.08 seconds, and then turned off for 0.02 seconds.

At time=0.5, the temperature $T_A$ of FIG. 15 is approximately 110 degrees, and accordingly, DIFF is calculated to be 10. Since 10 (i.e., the value of DIFF) is less than 60 (i.e., the value of $T_R$) and DIFF is greater than zero, the value of Z is calculated as 0.013. Since this value of Z is less than MIN, HON is set to 0.02, and HOFF is calculated as 0.08. As shown in FIG. 16, heat is applied to the sealing jaws for 0.02 seconds, and then turned off for 0.08 seconds.

TABLE I

| TIME | $T_A$ | DIFF | Z | Is Z < MIN? | HON | HOFF |
|---|---|---|---|---|---|---|
| 0 | 0 | 120 | — | — | 0.08 | 0.02 |
| 0.1 | 25 | 95 | — | — | 0.08 | 0.02 |
| 0.2 | 45 | 75 | — | — | 0.08 | 0.02 |
| 0.3 | 65 | 55 | 0.073 | N | 0.07* | 0.03 |
| 0.4 | 90 | 30 | 0.04 | N | 0.04 | 0.06 |
| 0.5 | 110 | 10 | 0.013 | Y | 0.02 | 0.08 |
| 0.6 | 125 | −5 | — | — | 0.00 | 0.10 |
| 0.7 | 115 | 5 | 0.006 | Y | 0.02 | 0.08 |
| 0.8 | 115 | 5 | 0.006 | Y | 0.02 | 0.08 |
| 0.9 | 115 | 5 | 0.006 | Y | 0.02 | 0.08 |
| 1.0 | 121 | −1 | — | — | 0.00 | 0.10 |

*this value(s) have been rounded to a time increment of 0.01 seconds

The above described method provides a heating control scheme suitable for a variety of pouch materials. It is suitable for temperature sensitive products (where overshoot of the desired temperature could cause product burning), and processes wherein cycle time is critical. As presented, the heat control scheme is dependent on the parameter settings which the user inputs into menu 119.

Other heat control schemes exist, for example, a time-on, time-off scheme is possible where a specified heat level is applied for a pre-set period of time. With such control schemes, heat may build up or accumulate over time, particularly in high-speed applications.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

PARTS LIST 10 pouch
12 side wall of pouch
14 side wall of pouch
16 seal
18 opening, mouth
20 stack
22,24 dunnage card
26 seal
28 pouch evacuation apparatus
30 pneumatic actuator
32 support block
34 probes or tubes
36 closing and sealing jaws
38 pneumatic actuators
40 actuator rods
42 mounting bars
44 sealing bars jaws
46 actuator rods
48 pneumatic actuators
50 pouch closing bars or clamping jaws
52 resilient material layer
54 frame
56 support surface
58 seal assembly
60 clamp assembly
62 snorkel assembly
64 mounting fixture
65 snorkel extension means
66 snorkel support member
68 snorkel guide member
69 snorkel guide member end
70 probe
72 probe end
74 first channel (thru snorkel guide member and snorkel support member)
76 second channel (thru probe)
82 sealing edges
86 thermocouple
90 clamping edges
94 clamping notches
98 aperture
100 flexible coupling
102 mounting bracket
104 probe holder
106 tube
108 vacuum generator 110 vacuum sensor
112 PLC (Programmable Logic Controller)
113 converter
114–118 flowchart steps
119 menu
120–148 flowchart steps
150–182 flowchart steps

What is claimed is:

1. A method for selectively applying heat to a sealing jaw to heat seal an open mouth of a pouch, said method comprising the steps of:

(a) selecting a total heat cycle time during which heat can be applied by said sealing jaw to said pouch;

(b) selecting a cycle time increment which is less than said total heat cycle time;

(c) selecting a minimum time increment during which heat can be applied to said sealing jaw, said minimum time increment being less than said cycle time increment;

(d) selecting a maximum time increment during which heat can be applied to said sealing jaw, said maximum time increment being greater than or equal to said minimum time increment, and being less than said cycle time increment;

(e) selecting a desired temperature at which to heat said sealing jaw to form the heat seal;

(f) selecting a baseline temperature by which to regulate the application of heat to said sealing jaw, said baseline temperature being less than said desired temperature;

(g) calculating a heating-on time by:
  sensing an actual temperature of said sealing jaw,
  determining a difference between said desired temperature and said actual temperature,
  setting said heating-on time to said maximum time increment if said difference is greater than or equal to said baseline temperature,
  setting said heating-on time to a value less than said maximum time increment and greater than zero if said difference is less than said baseline temperature, and greater than zero, and
  setting said heating-on time to zero if said difference is less than or equal to zero;

(h) heating said sealing jaw for said heating-on time;

(i) cooling said sealing jaw for the remainder of said cycle time increment by not heating said sealing jaw; and (j) repeating said calculating, heating, and cooling steps for each cycle time increment until said total heat cycle time is reached.

2. A method according to claim 1 further comprising the steps of selecting a chill time during which heat is not applied to said sealing jaw and said sealing jaw is in contact with the pouch, and chilling said sealing jaw for said chill time after said total heat cycle time is reached.

3. A method according to claim 1 wherein said step of setting said heating-on time to a value less than said maximum time increment and greater than zero comprises the steps of:

calculating a ratio by multiplying said difference times said maximum time increment and dividing by said baseline temperature;

setting said heating-on time to said minimum time increment if said ratio is less than said minimum time increment; and setting said heating-on time to ratio if said ratio is greater than or equal to said minimum time increment.

4. An apparatus for selectively applying heat to a sealing jaw to heat seal an open mouth of a pouch, comprising:

means for selecting a cycle time increment during which heat can be applied to said sealing jaw;

means for selecting a minimum time increment during which heat can be applied to said sealing jaw, said minimum time increment being less than said cycle time increment;

means for selecting a maximum time increment during which heat can be applied to said sealing jaw, said maximum time increment being greater than or equal to said minimum time increment, and being less than said cycle time increment;

means for selecting a desired temperature at which to heat said sealing jaw to form the heat seal;

means for selecting a baseline temperature by which to regulate the application of heat to said sealing jaw, said baseline temperature being less than said desired temperature;

means for sensing an actual temperature of said sealing jaw;

means for calculating a heating-on time for each cycle time increment based on a difference between said desired temperature and said actual temperature;

means for applying heat to said sealing jaw for said heating-on time; and means for turning off heat to said sealing jaw for the remainder of said cycle time increment.

5. An apparatus according to claim 4 wherein said means for calculating a heat-on time comprises:

means for setting said heating-on time to said maximum time increment if said difference is greater than or equal to said baseline temperature;

means for setting said heating-on time to a value less than said maximum time increment and greater than zero if said difference is less than said baseline temperature, and greater than zero; and means for setting said heating-on time to zero if said difference is less than or equal to zero.

6. An apparatus according to claim 4 wherein said means for setting includes a programmable logic controller.

* * * * *